May 25, 1943.  A. HALE  2,319,859
PROCESS AND APPARATUS FOR THE PREPARATION OF RUBBER COMPOUNDS
Filed March 6, 1941  3 Sheets-Sheet 1
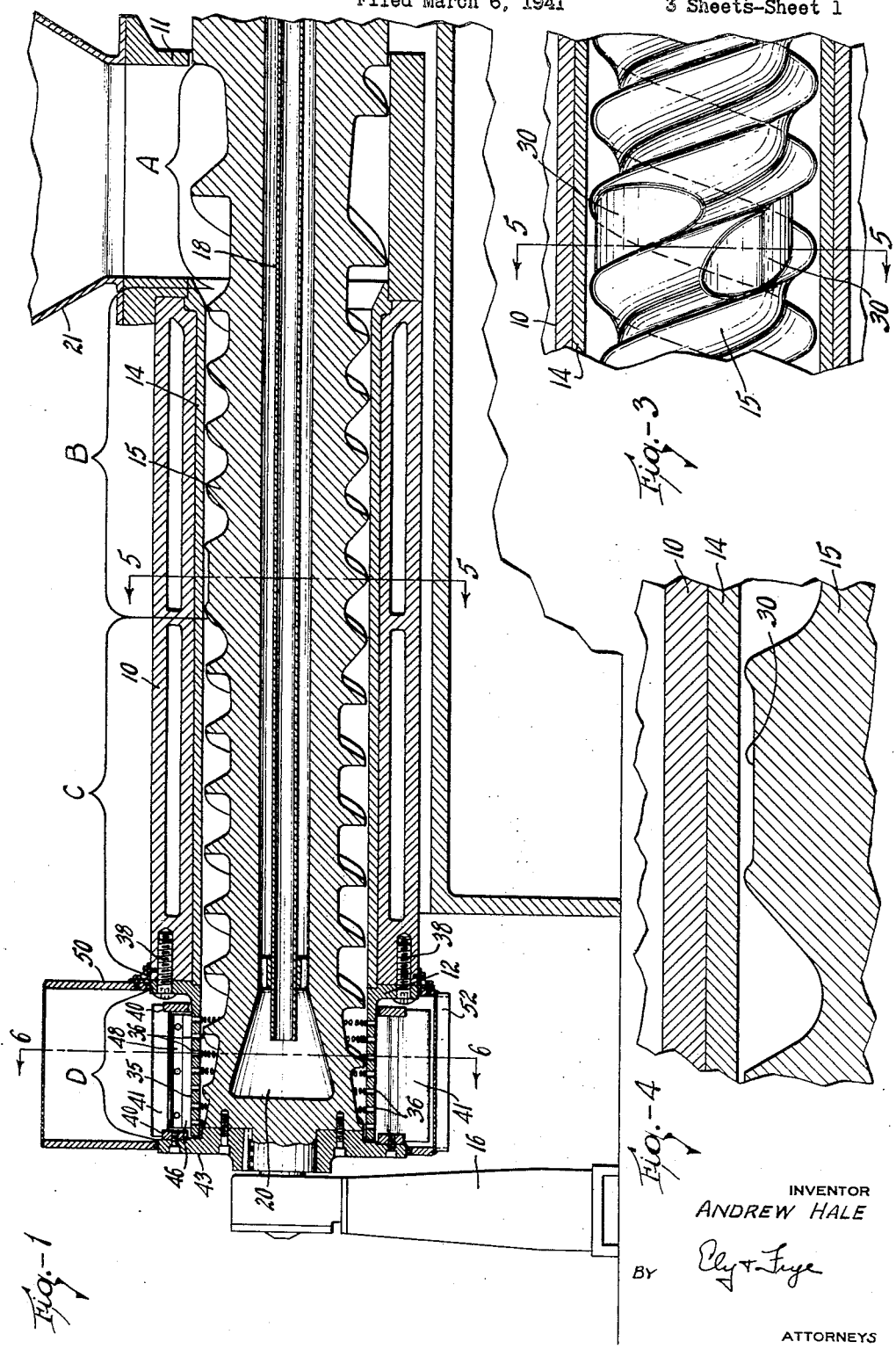
INVENTOR
ANDREW HALE
BY
ATTORNEYS

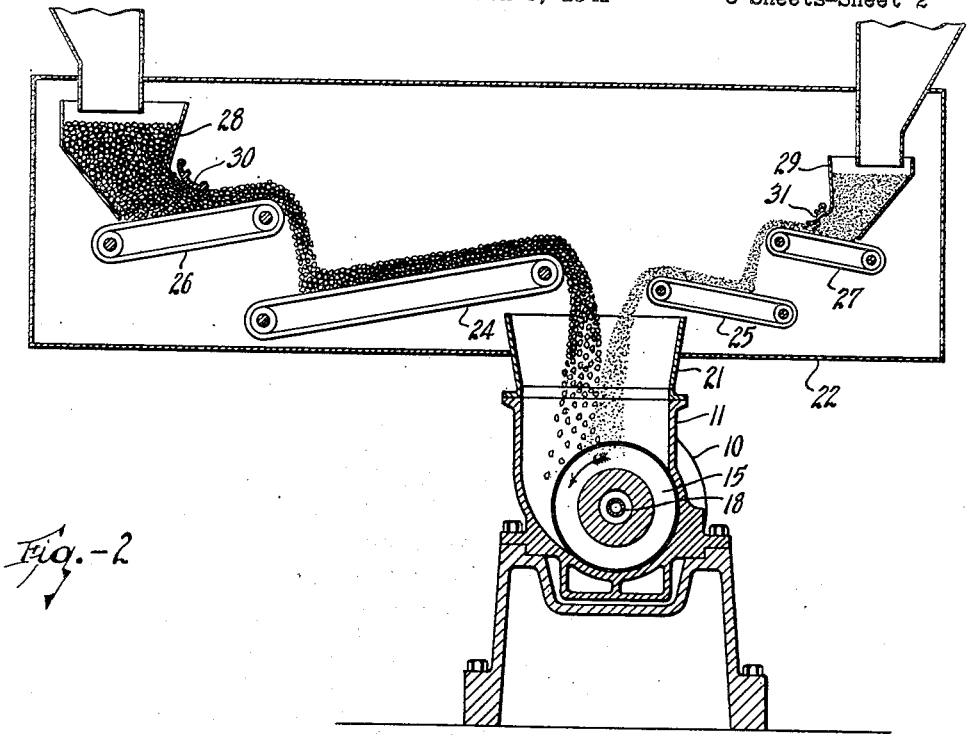
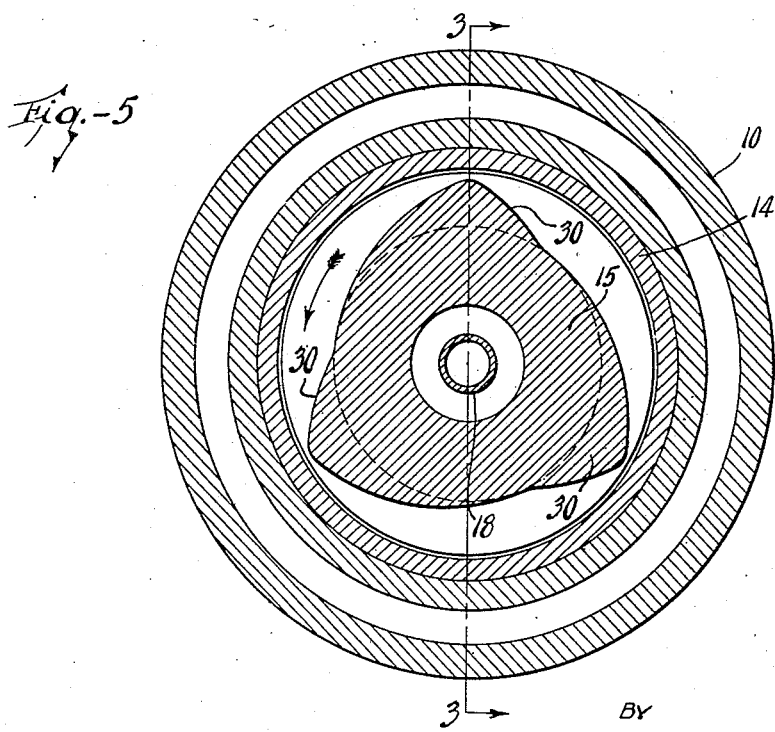

May 25, 1943.  A. HALE  2,319,859
PROCESS AND APPARATUS FOR THE PREPARATION OF RUBBER COMPOUNDS
Filed March 6, 1941  3 Sheets-Sheet 3

INVENTOR
ANDREW HALE

BY
ATTORNEYS

Patented May 25, 1943

2,319,859

UNITED STATES PATENT OFFICE 2,319,859

PROCESS AND APPARATUS FOR THE PREPARATION OF RUBBER COMPOUNDS

Andrew Hale, Akron, Ohio

Application March 6, 1941, Serial No. 381,946

16 Claims. (Cl. 18—12)

It is the object of the present invention to provide for the continuous mixing of rubber and such compounding ingredients as may be added thereto to produce compounded rubber stocks for various purposes.

The present invention is in the nature of an improvement upon the invention disclosed and claimed in my prior Patent No. 2,215,435, dated September 17, 1940. The invention shown in this prior patent made it possible to obtain crude rubber in particle or pellet form, and thus to secure the useful and valuable results shown and described herein.

It is the purpose of the present invention to provide a process and apparatus whereby it is possible to utilize the pelletized rubber in a continuous mixing process, coupled with a repelletizing apparatus in which the rubber, compounded with other ingredients, may be pelletized. The result is that it is possible to compound the pelletized rubber with exact and measured quantities of other ingredients in a continuous stream, which stream may be again pelletized so that the compound rubber in pelletized or particle form may be conveyed directly to points where it can be immediately used, or to bins or storage points.

This procedure which is the subject matter of the present invention and the apparatus by which it can be practically applied give great efficiency and economy in the operation of a rubber manufacturing plant. It eliminates much labor and waste, and the operations of compounding the stock and subsequently transporting the compounded stock are greatly simplified. In addition, the stock is more uniformly compounded and blended, for the continuous process of mixing the rubber and reducing the compounded rubber to pellet form permits of blending the stocks with greater uniformity than is possible or practicable by the older methods.

The ability to achieve these results in a continuous operation and the compounding, mixing, pelletizing and transporting of the stock make for cheaper, better and more efficient operation. It also eliminates the escape of carbon black or other dust-like compounding agents about the mill room.

It is also an object of the present invention to provide a new and improved type of continuous mixer in which the rubber and compounding ingredients are introduced at one end, in which they are thoroughly mixed so that the compounding material is uniformly dispersed through the rubber, so that as the compounded rubber reaches the discharge end of the machine it may be reduced into small pellets or particles each of which contains uniform percentages of rubber and compounds.

It is also an object of the invention to improve upon the pelletizing apparatus and to produce a better and more efficient type of pelletizing apparatus and one which is particularly adaptable for continuous operation.

In the drawings and description is disclosed the best known or preferred form of the invention, it being understood, however, that changes and modifications may be made without departing from the basic principles of the invention, all within the scope of the invention as set forth in the appended claims.

In the description which will follow, the process and apparatus will be treated particularly as applied to the mixing of crude rubber in pellet form with carbon black, such an operation being particularly adaptable for the making of master batches, but other stocks may be made with equal facility and with similar advantages.

As to certain features of the invention, it will be understood that instead of introducing the rubber into the machine in pellet form, it may be introduced in other forms and also discharged in other forms, and as to such aspects of the invention, the initial use of pellet rubber is non-essential. Also, it will be understood that the entire combination of elements need not be employed in all cases.

In the drawings:

Fig. 1 is a longitudinal vertical section taken along the axis of the mixing machine or unit, the rubber and other ingredients entering at the right and being discharged at the left as pellets of compounded rubber.

Fig. 2 is a vertical section at the intake end of the machine, showing the preferred manner of introducing carefully measured quantities of rubber and compounding ingredients at a uniform rate so as to secure pellets of uniform composition at the end of the operation.

Fig. 3 is an enlarged detail section on the line 3—3 of Fig. 5, with the section of the screw in elevation.

Fig. 4 is an enlarged view taken along the screw, showing the detail of the screw thread and one of the several dams therein which break up any tendency of the rubber to flow through the machine without being thoroughly mixed and kneaded.

Fig. 5 is a section approximately along the line

5—5 of Fig. 3, showing the manner in which the dams are distributed around the screw.

Figure 6:
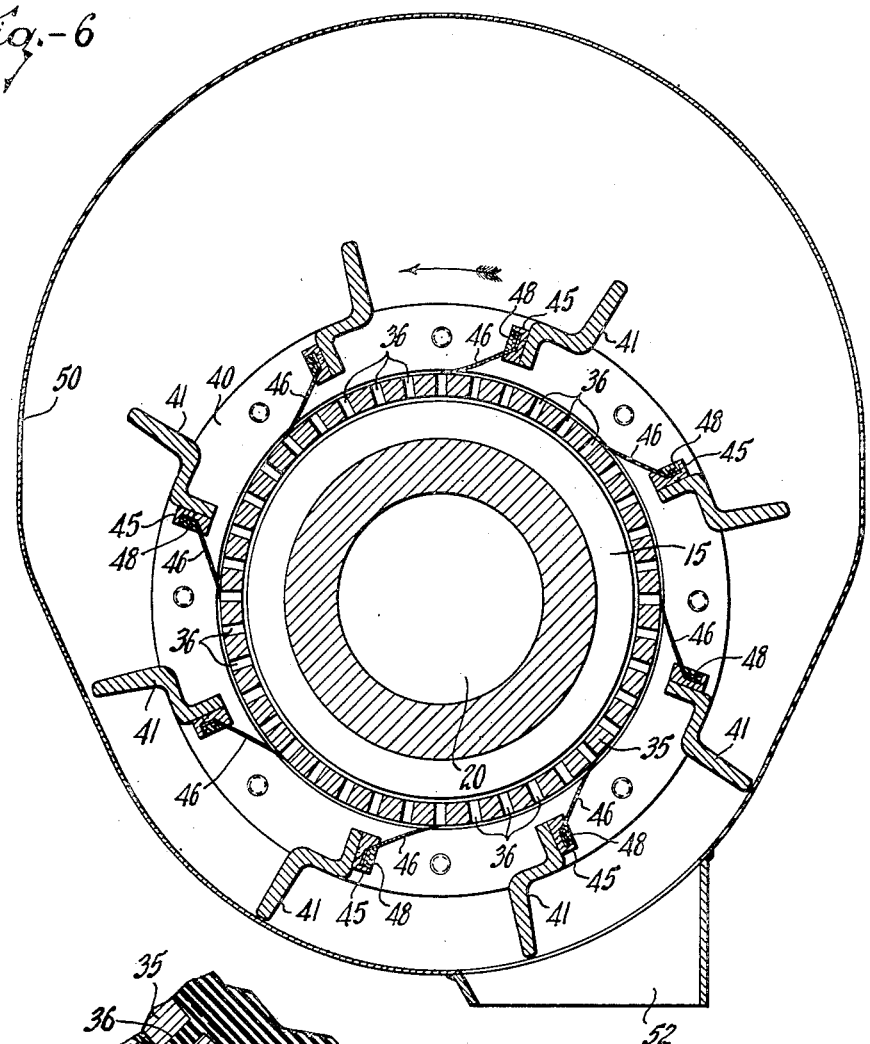
Figure 7:
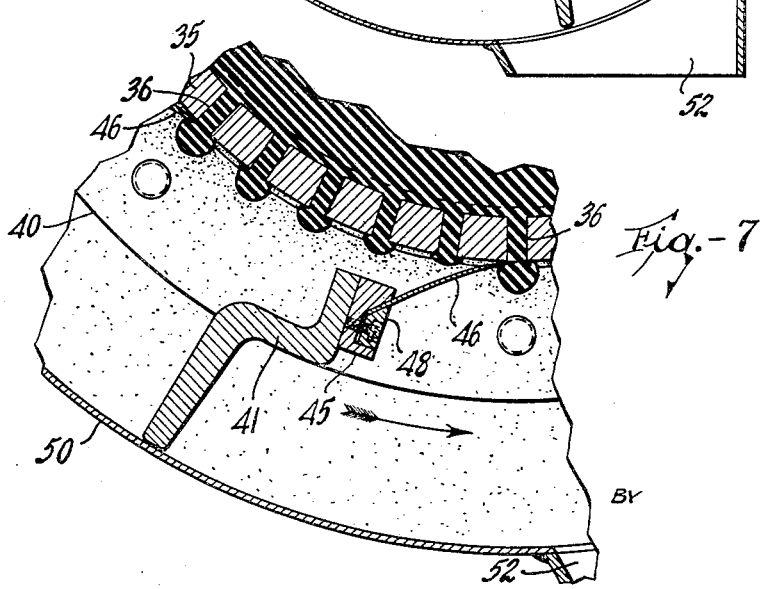

Fig. 6 is an enlarged section at the pelletizer head on the line 6—6 of Fig. 1; and Fig. 7 is a detail of the pelletizing knives.

Referring to the details of the machine, which may be modified as stated, the apparatus comprises a main casing or housing 10 which is jacketed as shown for the circulation of heating or cooling mediums by which the temperature of the rubber is controlled. As considerable heat is developed during working, it is desirable to control the temperature to prevent injury to the rubber. At the entrance of the machine is provided the hopper section 11 and at the discharge end is the pelletizer head 12 fastened to the end of the casing 10. Interiorly of the casing is the liner 14 which may be made in sections, if desired.

Within the liner is the mixing and impelling screw 15, the details of which are important and will be later described. The screw is driven by any suitable mechanism in the direction of the arrow in Fig. 5. The forward end of the screw is supported in a bearing in the stanchion 16. The interior of the screw is hollow and provided with piping 18 by which a suitable medium is circulated to keep the temperature at the right level for proper working. At the far end of the screw may be provided the large chamber 20.

At the hopper 11 is provided the chute 21 which preferably opens into an enclosed chamber 22 so that the compounding ingredients will be prevented from escaping. Delivering into the chute are two measuring conveyors 24 and 25, which are of the usual or standard construction, being driven at definite and regulated speeds to deliver exact measured quantities of the ingredients, and above these conveyors are arranged other conveyors 26 and 27, respectively, which are also driven at the measured speeds. These conveyors receive the raw materials from hoppers or chutes 28 and 29 with adjustable delivery control gates 30 and 31. As shown, the unit to the left of Fig. 2 is designed to deliver rubber in pellet form, it being possible, because of the fact that the rubber is in pellet form, to adapt measuring conveyors to the process, thus providing an uninterrupted stream of known and controlled volume at definite timed relation to the apparatus.

The other conveyor is shown as supplying carbon black in the same manner, but in lesser volume per minute, the proportions illustrating a selected ratio of rubber and carbon black. Of course other materials may be added to the mix and the number of measuring conveyors may be multiplied, if desired, so that any number of measured streams may flow at fixed rates into the hopper. Where carbon black is specifically mentioned, it will be understood that other ingredients may be substituted.

As shown, the screw is provided with three parallel threads forming three channels or grooves about the screw, although the number of threads is optional. It may be considered as divided into four sections. The first section A is located in the hopper and is a thread portion of high pitch which delivers the rubber and carbon black to the next stage. The threads are preferably formed with their forward faces at substantially right angles to the axis of the screw to operate as impellers which deliver the ingredients into the liner 14.

The next section of the screw, designated as B, is the mixing and kneading section where the added ingredients are thoroughly and continuously dispersed in the rubber as it moves along the casing. While the other sections of the screw aid in dispersing the added ingredients through the rubber, the larger part of the dispersing operation takes place in the section B; in fact, when the rubber leaves this section of the screw the dispersion has been substantially consummated.

As shown, the threads in the section B are greatly reduced in pitch so that the speed of the rubber through the machine is greatly reduced. At the same time the cross-sectional contour of the threads is altered to perform the necessary working of the rubber. Both sides of each thread are given a gentle slope, the leading side being at a longer angle than the trailing side of the thread. The action is that of a mulling screw, the rubber being repeatedly squeezed, worked over and kneaded, so that the carbon black or other ingredients are thoroughly distributed and dispersed in the rubber as it proceeds along the screw. The slow travel of the rubber and the thorough mixing operation secured by the action of this portion of the screw and the rolling over and over of the rubber upon itself, in conjunction with the squeezing and kneading action imparted by the screw, insure that no section of the rubber will escape the thorough working which is necessary to secure complete dispersion.

In order to prevent any tendency of the rubber to slip through the machine and thus avoid the requisite working, there is provided, as shown, a series of dams or obstructions in each groove which stops any tendency of the rubber to flow in a current through the mass and insures that it will be thoroughly worked over. While more than one set of dams may be employed along the screw as may, in some cases, be necessary to secure complete mixing, one only is shown as in Figs. 3 and 4. As there are three separate grooves, there are provided three dams 36, one in each groove, the dams being distributed around the screw approximately as shown in Fig. 5. As shown, each dam extends parallel to the axis of the screw so that the crest of the dam is parallel with the wall of the liner, but is slightly below the crest of the screw threads. Other arrangements of the dams may be utilized; for example, the dams may be formed around the screw, although the axial alignment is preferred. As the screw rotates, the leading side of each dam is sloped at a gradual incline to prevent the pocketing of any mass of the rubber, and the trailing side of the dam is more abrupt.

It will be noted that all of the rubber in its passage through this portion of the machine will be spread out in a thin layer in order to pass between the crests of the several screw threads and the inner surface of the liner, and between the crests of the several dams and the inner surface of the liner. This action wipes the rubber and forces the carbon black or other pigment into the rubber so that the dispersion is uniform throughout the whole mass.

The third section of the screw, designated at C, is primarily an impelling section such as A, except that the pitch of the threads is substantially the same as the pitch in section B, but the leading faces of the threads are perpendicular or substantially perpendicular to the axis of the screw. After the rubber is kneaded and thoroughly mixed in the section B, it passes into the section C and the operation of dispersing the compounding ingredients is finished off during this portion of the operation. This section of the screw prepares the rubber for the final pelletizing operation.

The section D of the screw is fanned out into cone form and is located in the pelletizer head, the gradual increase in the radius of the thread roots insuring that the rubber is evenly distributed over the interior surface of the pelletizer head so that it issues substantially uniformly through all of the apertures therein.

The pelletizer head consists of a heavy steel cylinder 35 of sufficient strength and thickness to withstand the immense pressure of the rubber, and in this cylinder are formed a plurality of holes 36 through which the rubber is forced, as shown in Fig. 7. The rubber, as it passes through the apertures, is under great compression so that it will expand or mushroom upon leaving the plate. In order to prevent the adjacent streams of rubber from contacting as they issue from the die and to insure that one stream of rubber will not be forced by the knives into contact with an adjacent stream before the pellets are severed, the holes are spaced apart at distances substantially greater than the diameter of the holes.

The head is secured to the end of the casing 10 by means of bolts 38, and surrounding the head is of the rotary cutter which subdivides the several streams or filaments of rubber into the separate particles. The cutter, in the form shown, consists of two rings 40 connected by a plurality of longitudinal bars or blade carriers 41. The cage, consisting of the members 40 and 41, is attached to an end plate 43 secured to the end of the screw 15 and rotated thereby.

On each bar 41 is secured a bearing plate 45, the forward surface of which is beveled to receive the spring steel knife blade 46, the cutting edge of which bears against the surface of the pelletizer head. The blade is securely anchored on the plate 45 by a wedge-shaped lock bar 48. This construction will hold each blade securely in position without the use of screws, bolts, or other attaching means and will permit easy replacement of any blade.

In operation, as the rubber is forced from the apertures in the head, it is severed by one of the knife blades, a sufficient interval being allowed to permit the requisite quantity of rubber for a pellet to issue from the head before the next knife blade reaches it. It is advisable to provide spring steel blades passing over the surface of the head, and this permits the head to expand, as it will from the heat generated by the rubber, without injury to the knife. For the same reason the space is provided, as shown, between the inner face of the rings 40 and the head.

As explained in detail in my earlier patent, the crude rubber as it issues from the face of the pelletizer head is hot and, therefore, soft and very tacky. If any stream of rubber contacts another stream before the pellet is formed, a mass of rubber will result. For the same reason every surface of the pellet must be coated with a substance which will render the surfaces thereof non-tacky, for otherwise the pellets will seize upon one another and form a conglomerate mass rather than a body of separate, non-adhering pellets.

For these reasons the head is surrounded by a casing 50 in which there is maintained a supply of soapstone, zinc stearate, carbon black, or other non-adhesive agent in powdered form which is kept agitated by a turbulator of any desired form (not shown), so that the entire atmosphere within the casing and surrounding the head is a cloud of powdered, tack-eliminating material. This material will be deposited over all of the exposed surfaces of the issuing streams of rubber and the blades and will cling to the surface of the head and be scraped therefrom by the blades which insures that the under side of each pellet as it is cut from the stream will also be coated with the material. The thorough coating of all of the surfaces of the pellets is essential for the formation of the pelletized compounded rubber, otherwise the pellets will go into a conglomerate mass and the purpose of securing the individual, separate pellets will be defeated. In Fig. 7 it has been attempted to show the distribution of the powder over the surface of the head and over the pellets.

The pellets fall to the bottom of the casing where they are scraped by the bars 41 into the discharge 52. From this point the pellets are conveyed to the points where the rubber is further worked or to storage bins if desired.

It will be appreciated that the form of the head is not essential to some aspects of the invention and the means employed to render the surfaces of the pellets non-tacky may be changed.

It will be seen that by the apparatus and method shown and described herein, crude rubber and compounding ingredients are thoroughly mixed in accurate proportions in a continuous operation and compounded rubber is secured in pellet form so that it may be transported by conveyors to other parts of the factory. The entire operation is a continuous one, the rubber flowing in an endless stream and being mixed and worked in its passage. This makes a vast saving in the mechanical operations of compounding and milling rubber and eliminates the ordinary batch milling and trucking of the ingredients and the compounded rubber. The provision of compounded rubber in pellet form also facilitates the other and later operations in the factory.

Many other advantages and benefits flow from this invention, and it is not to be limited to exact conformity with the details which have been given here.

What is claimed is:

1. The process of preparing compounded rubber comprising flowing crude rubber in pellet form and a compounding ingredient in separate measured streams toward each other to form a combined stream, propelling the materials of the combined stream and mixing and kneading the same continuously while in motion to thoroughly disperse the compounding ingredient in the rubber, and after the rubber and compounding ingredient have been mixed together subdividing the moving mass into pellet form.

2. The process of preparing compounded rubber comprising supplying a measured stream of rubber in pellet form, adding to the stream measured quantities of a compounding ingredient, working said rubber while in motion by applying repeated rolling, squeezing and kneading operations until the compounding ingredient is dispersed throughout the stream of rubber, and then subdividing the mass of compounded rubber into pellet form.

3. The process of manufacturing compounded rubber comprising forming a stream of rubber and compounding agents, kneading and working the stream of rubber by repeated rolling and squeezing operations performed while the stream is advancing, and subdividing the compounded rubber into a multiplicity of small, separate particles at the end of the kneading operation without interrupting the flow of the rubber.

4. The process of manufacturing compounded rubber comprising the steps of joining a measured stream of rubber in pellet form and a measured stream of the compounding material, and dispersing the material in the rubber by repeated kneading and rolling operations without interrupting the flow of the rubber.

5. A continuous process of compounding rubber comprising joining a continuously moving stream of rubber and a continuously moving stream of compounding ingredients, said streams being of constant volume and flow, and after uniting said streams kneading and working the rubber with said ingredients until dispersion is secured without interrupting the flow of the stream.

6. A continuous process of compounding rubber comprising joining a continuously moving stream of rubber and a continuously moving stream of compounding ingredients, said streams being of constant volume and flow, and after uniting said streams kneading and working the rubber with said ingredients until dispersion is secured and subdividing the compounded rubber into pellet form without interrupting the flow of the stream.

7. In an apparatus for compounding rubber, conveyors for supplying continuously moving streams of rubber and compounding ingredient, means associated with said conveyors for regulating the rubber and ingredient so that they are delivered at constant volumes, a continuously rotating screw to which said streams are delivered, said screw having a mixing and kneading section and a discharge section, a head surrounding the discharge section, said head being provided with a plurality of apertures, a cutter movable over the surface of the head and means for distributing a non-adhesive agent over the entire area of the head.

8. In an apparatus for compounding rubber, conveyors for supplying continuously moving streams of rubber in pellet form and compounding ingredient, means associated with said conveyors for regulating the rubber and ingredient so that they are delivered at constant volumes, a continuously rotating screw to which said streams are delivered, said screw having a mixing and kneading section and a discharge section, a head surrounding the discharge section, said head being provided with a plurality of apertures, a cutter movable over the surface of the head and means for distributing a non-adhesive agent over the entire area of the head.

9. In an apparatus for the uses and purposes set forth, a casing, a screw in the casing for continuously kneading the rubber and dispersing the compounding ingredients therein, said screw having a plurality of parallel threads the crests of which are adjacent the inner wall of the casing, and obstructions located in the several grooves to retard the movement of the rubber in the grooves.

10. In an apparatus for the uses and purposes set forth, a casing, a screw in the casing for continuously kneading the rubber and dispersing the compounding ingredients therein, said screw having a plurality of parallel threads the crests of which are adjacent the inner wall of the casing, and dams located in the several grooves to retard the movement of the rubber in the grooves.

11. In an apparatus for the uses and purposes set forth, a casing, a screw in the casing for continuously kneading the rubber and dispersing the compounding ingredients therein, said screw having a plurality of parallel threads the crests of which are adjacent the inner wall of the casing, and dams located in the several grooves to retard the movement of the rubber in the grooves, the crests of the dams being of a radius substantially equal to the radius of the threads at their crests.

12. In an apparatus for the uses and purposes set forth, a casing, a screw in the casing for continuously kneading the rubber and dispersing the compounding ingredients therein, the crest of the screw being adjacent the inner wall of the casing, and a dam parallel to the axis of the screw located in the groove to retard the movement of the rubber in the groove.

13. An apparatus comprising, a casing, a screw in the casing for continuously kneading the rubber, the crest of the screw being adjacent the inner wall of the casing, and an obstruction located in the groove and positioned transversely of the direction of flow of the rubber to retard the flow of the rubber in the groove.

14. In an apparatus for the uses and purposes set forth, a casing, a screw in the casing for continuously kneading the rubber and dispersing the compounding ingredients therein, the crest of the screw being adjacent the inner wall of the casing, and a dam parallel to the axis of the screw located in the groove to retard the movement of the rubber in the groove, the crest of the dam being of a radius substantially equal to the radius of the thread at its crest.

15. In an apparatus for the uses and purposes set forth, a casing, a screw in the casing for continuously kneading the rubber and dispersing the compounding ingredients therein, the crest of the screw being adjacent the inner wall of the casing, and a dam located in the groove to retard the movement of the rubber in the groove, the crest of the dam being of a radius substantially equal to the radius of the thread at its crest.

16. In an apparatus for the uses and purposes set forth, a screw, said screw having a plurality of parallel threads, the surfaces of each thread tapering toward the crests, a casing surrounding the screw, the interior wall of the casing being closely adjacent the crests of the threads, and a dam located in each groove between threads, said dam extending along the screw and tending to retard the passage of the rubber in the grooves.

ANDREW HALE.